US008982783B2

(12) United States Patent
Miller et al.

(10) Patent No.: US 8,982,783 B2
(45) Date of Patent: Mar. 17, 2015

(54) METHOD AND SYSTEM FOR SETTING QUALITY OF SERVICE FOR A BEARER IN RESPONSE TO AN EMERGENCY EVENT

(75) Inventors: Trent J. Miller, West Chicago, IL (US); Anatoly Agulnik, Deerfield, IL (US); Randy L. Ekl, Lake Zurich, IL (US); James A. Marocchi, Winfield, IL (US); Aparna Pandey, Chicago, IL (US); Peter E. Thomas, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 162 days.

(21) Appl. No.: 13/180,032

(22) Filed: Jul. 11, 2011

(65) Prior Publication Data
US 2012/0026880 A1 Feb. 2, 2012

Related U.S. Application Data

(60) Provisional application No. 61/369,700, filed on Jul. 31, 2010.

(51) Int. Cl.
H04W 4/00 (2009.01)
H04W 76/04 (2009.01)
H04W 4/22 (2009.01)
H04W 76/00 (2009.01)
H04W 88/16 (2009.01)

(52) U.S. Cl.
CPC ............... *H04W 76/04* (2013.01); *H04W 4/22* (2013.01); *H04W 76/007* (2013.01); *H04W 88/16* (2013.01)
USPC ........................................ 370/328

(58) Field of Classification Search
USPC ......... 370/229, 230, 235, 231, 232, 234, 252, 370/329, 395.21, 395.43; 455/404.2, 90.2, 455/518
See application file for complete search history.

(56) References Cited

U.S. PATENT DOCUMENTS

| 7,346,340 B2 | 3/2008 | Purnadi et al. |
| 7,565,160 B2 | 7/2009 | Chambers et al. |
| 7,573,380 B2 | 8/2009 | Pinder |
| 7,574,195 B2 | 8/2009 | Krasner et al. |
| 2002/0087194 A1 | 7/2002 | Russell |

(Continued)

FOREIGN PATENT DOCUMENTS

| WO | 99/55115 A1 | 10/1999 |
| WO | 2009026088 A2 | 2/2009 |

OTHER PUBLICATIONS

PCT International Search Report Dated Sep. 28, 2011 for Counterpart Application.

(Continued)

*Primary Examiner* — Abdullah Riyami
(74) *Attorney, Agent, or Firm* — Steven May

(57) ABSTRACT

An interoperability gateway performs a method for setting Quality of Service for a bearer in response to an emergency event. The method includes the interoperability gateway performing: receiving a indication of an emergency event for a first user, wherein the first user is operating a first device in a first network of a first network type; responsive to receiving the indication, determining a set of devices related to the first user, wherein the set of devices includes the first device and at least a second device operating in a second network of a second network type; instructing the second network to modify at least one Quality of Service setting for the second device.

17 Claims, 3 Drawing Sheets

(56) References Cited

U.S. PATENT DOCUMENTS

| | | |
|---|---|---|
| 2006/0025158 A1* | 2/2006 | Leblanc et al. ............. 455/456.2 |
| 2007/0049314 A1* | 3/2007 | Balachandran et al. ...... 455/518 |
| 2007/0178851 A1* | 8/2007 | Doyle .......................... 455/90.2 |
| 2008/0046963 A1 | 2/2008 | Grayson et al. |
| 2008/0178251 A1 | 7/2008 | Shin |
| 2009/0054029 A1* | 2/2009 | Hogberg et al. ........... 455/404.2 |
| 2009/0137227 A1 | 5/2009 | Bencheikh |
| 2010/0135205 A1 | 6/2010 | Li et al. |
| 2010/0234045 A1* | 9/2010 | Karr et al. .................. 455/456.1 |
| 2012/0026947 A1 | 2/2012 | Miller et al. |

OTHER PUBLICATIONS

Intention to Grant mailed Jan. 31, 2014 in corresponding European Patent Application No. 11 743 694.9.

European Search Report and Opinion mailed Sep. 15, 2014 in corresponding European Patent Application No. 14170503.8.

\* cited by examiner

METHOD AND SYSTEM FOR SETTING QUALITY OF SERVICE FOR A BEARER IN RESPONSE TO AN EMERGENCY EVENT

TECHNICAL FIELD

The technical field relates generally to communication systems and more particularly to setting Quality of Service (QoS) for one or more bearers in response to an emergency.

BACKGROUND

During an emergency event, such as one involving a public safety responder, the responder can for instance push a button on their land mobile radio (LMR). This indicates an emergency condition to the LMR system and causes the LMR system to elevate priority for that device and to indicate the emergency condition to a console operator. Thus, existing technology enables an elevation of QoS for resources to the LMR device that reported the emergency condition.

However, in today's public safety environment, there are typically a number of devices that are related to a particular public safety user, for instance one involved in an emergency event. For example, the public safety user can himself carry multiple devices such as the LMR radio and one or more broadband devices. In addition, other devices may be within proximity of the responder involved in the emergency event or may share the same public safety agency as the responder involved in the emergency event. Moreover, one or more of the devices related to the responder involved in the emergency event may be connected to different access networks using the same or different radio technologies. A shortcoming of today's technology is that there is currently no effective way to set QoS for one or more bearers allocated to at least two of the devices deemed to be related to the user involved in the emergency event.

Thus, there exists a need for a method and system for coordinating the setting of QoS for one or more bearers for a set of communication devices related to a user, in response to an indication of an emergency event for the user.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
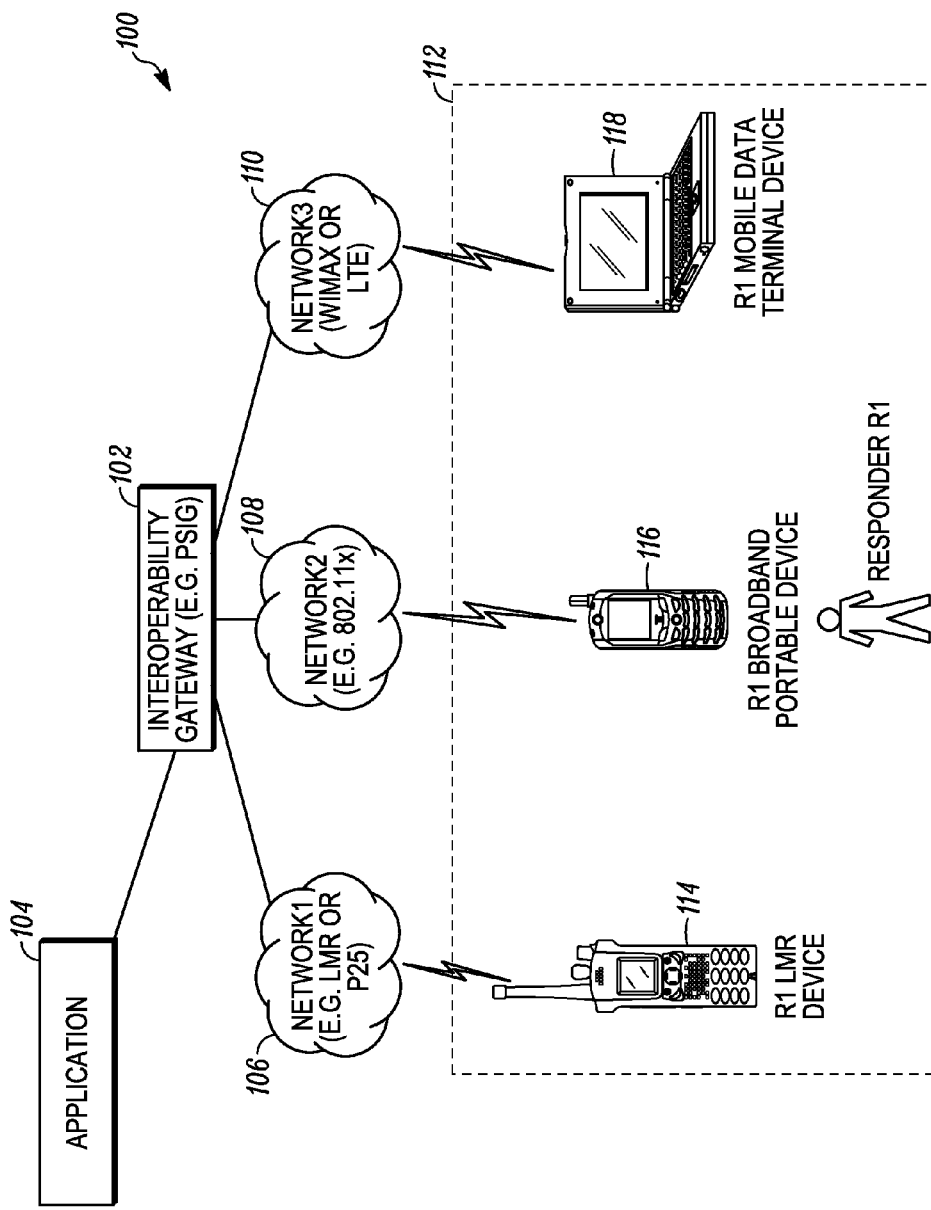
FIG. 1 is a system diagram of a communication system that implements setting of QoS for a bearer in response to an emergency event, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, an interoperability gateway receives a indication of an emergency event for a first user, wherein the first user is operating a first device in a first network of a first network type and responsive to receiving the indication, determines a set of devices related to the first user, wherein the set of devices includes the first device and a second device operating in a second network of a second network type. The interoperability gateway further instructs the second network to modify at least one Quality of Service setting for the second device. Those skilled in the art will realize that the above recognized advantages and other advantages described herein are merely illustrative and are not meant to be a complete rendering of all of the advantages of the various embodiments.

Referring now to the drawings, and in particular FIG. 1, a system diagram of a communication system that implements the setting of QoS for a bearer in response to an emergency event in accordance with some embodiments is shown and indicated generally at 100. The system 100 includes: an interoperability Gateway 102 (for instance a combination of public safety interoperability Gateway (PSIG) and QoS broker); an application 104 running on an infrastructure device (not shown); three networks including a network1 106, a network2 108, and a network3 110; and a plurality of communication devices 114, 116, and 118.

The networks 106, 108, and 110, are each characterized by a network type, wherein the network type means the type of radio access technology or, in other words, wireless access technology implemented to enable a communication device to access the network. Networks 106, 108, and 110 can all be of the same network type or a combination of different network types, for instance different types of cellular networks, 4G networks, 3G networks, broadband networks, or narrowband networks. Illustratively, as shown in FIG. 1, network 106 is a narrowband network (e.g., and LMR or Project 25 network), network 108 is a broadband 3G network (e.g., an 802.11-based network), and network 110 is a broadband 4G network (e.g., WiMAX or LTE).

Wireless networks 106, 108, and 110 include a number of infrastructure devices for facilitating communications for wireless communication devices. Such infrastructure devices depend on the radio access technology implemented by the network and may accordingly include, but are not limited to, bridges, switches, zone controllers, base station controllers, repeaters, base radios, base stations, base transceiver stations, evolved NodeBs (eNodeBs), access points, routers or any other type of infrastructure equipment interfacing a communication device in a wireless environment.

Each network 106, 108, and 110 can span one or more logical jurisdictions, wherein a jurisdiction is defined by a geographic boundary that includes one or more cells or as defined by geo-coordinates or mapping coordinates, for instance. Each cell is served by a base station, which in turn serves as a point of access for the wireless devices to be allocated wireless resources. Each cell represents a geographic coverage area that provides the wireless resources and/or wired resources, also termed herein as bearers, for carrying data (or SDFs) for wireless devices connected to the radio access network. Each cell is defined as being inclusive of a single base station's coverage area or a portion of a base station coverage area and can be identified by a cell identifier.

As used herein, the term bearer or bearer resource is defined as a transmission path in a wireless network (such as a radio access network (RAN)) and is used to carry wireless device data traffic (also termed, herein, as communications or service data flows "SDFs"). A bearer is further defined as a set of network resources (wireless and/or over the wired network) that are allocated for delivery of traffic towards one or more devices in a given network. A bearer can be bidirectional, i.e., having both an uplink path from a wireless device to the application 104 and a downlink path from the application 104 to the wireless device; or a bearer can be unidirectional, such as a common point-to-multipoint (PTM) downlink path from the application 104 to the wireless devices for multicast or broadcast traffic. A bearer can be point-to-point (PTP) (such as a dedicated bearer or a default bearer in an LTE network associated with a single device), or a PTM bearer (such as a multicast or broadcast bearer associated with one or more devices) and has associated therewith a set of characteristics or attributes including, but not limited to, QoS, a carrier frequency at which data is modulated, a particular bandwidth, bit rate, etc. A default bearer, as in an LTE network, is defined as a non-GBR (guaranteed bit rate) bearer that provides for "best effort" SDF transmission and is allocated to a wireless device for the duration of its attachment to the access network and need not be explicitly requested. A dedicated bearer, as in an LTE network, is defined as any additional bearer that is established for the same wireless device and is specifically requested by (or on behalf of) a wireless device and can be either non-GBR or GBR.

A bearer can be characterized by a level of Quality of Service, which is interchangeably, referred to herein as the Quality of Service for a bearer. Quality of Service refers to resource reservation control mechanisms and is defined as the ability to provide different priority for two or more different applications, users, or data flows, or to guarantee a certain level of performance to a data flow. For example, such control mechanisms can include, but are not limited to, one or a combination of: bearer allocation, retention and pre-emption, scheduling priority for packets, level of performance of SDFs, admission priority, packet latency, packet loss rate, effective bandwidth, minimum bandwidth, maximum bandwidth, required bit rate, delay, jitter, packet dropping probability, and/or bit error rate may be guaranteed. Quality of Service is defined and indicated by one or more parameters or attributes (such as Allocation and Retention Priority (ARP), QoS Class Identifier (QCI), Maximum Bit Rate (MBR), Guaranteed Bit Rate (GBR), etc., in an LTE system or a DSCP (differentiated services code point) in a 3G system).

In an illustrative embodiment implemented in an LTE system, QoS, and hence priority, is determined or quantized based on one or more QoS parameters included in a set (i.e., one or more) of policy rules (e.g., Policy and Charging Control (PCC) rules) selected for the wireless device, wherein the policy rules may include one or more of QoS rules or parameters, billing and charging rules, authorization rules or rules about which applications can be used, and which types of bearers may or may not be established or are allowed to be established or allocated to the wireless device in a jurisdiction. In one implementation, the QoS parameters (included in the policy rules for the wireless device) comprise any combination of the following EPS bearer parameters: QCI, ARP, GBR, and MBR. The QCI parameter controls bearer scheduling priority. The ARP parameter controls bearer allocation and retention priority, and the GBR and MBR parameters control the bit rate of the SDF, e.g., guaranteed or maximum bit rate of the SDF, while sent over the LTE system. Other possible QoS parameters include, but are not limited to, per APN (access point node) Aggregate Maximum Bit Rate (APN-AMBR) and per UE (user equipment) Aggregate Maximum Bit Rate (UE-AMBR).

Turning back to the elements of system 100, the interoperability Gateway 102 interfaces with the application 104 through an application programming interface (API). The interoperability Gateway 102 further interfaces with the networks 106, 108, and 110. In operation, and in accordance with the present teachings, the interoperability Gateway 102 receives an indication of an emergency event for a user of a wireless device in the system and applies a set of stored policy rules to modify or set QoS for one or more bearers (across multiple networks) allocated to a set of devices related to the user involved in the emergency event. As used herein, an emergency event means an event that requires, based on a pre-established policy, an elevated QoS for one or more applications on the device.

Communication devices 114, 116, and 118 are also commonly referred to in the art as mobile devices, access devices, access terminals, user equipment, mobile stations, mobile subscriber units, subscriber units, user devices, and the like. These communication devices can be any type of communication device such as radios, mobile phones, mobile data terminals, Personal Digital Assistants (PDAs), laptops, two-way radios, cell phones, etc. The communication devices send and receive media using one or more applications in the communication devices. The media is transported over the access network 106, 108, or 110 to which the communication device is attached using one or more bearers allocated to the wireless device. More particularly, upon attaching to an authenticating with the access network 106, 108, and 110, one or more bearers is allocated for use of a wireless device by default (e.g., a default bearer within an LTE system) or upon request (e.g., a dedicated bearer within an LTE system).

The application 104 communicates with one or more applications in the communication devices 114, 116, and 118 over the, respective, access network to which the communication devices are attached or connected using the one or more allocated bearers. In an illustrative implementation, the application 104 is included in an infrastructure device operating in a public safety agency also referred to herein simply as an "agency". For instance, the application 104 is included in a computer aided dispatch (CAD) system or a radio console.

Figure 2:
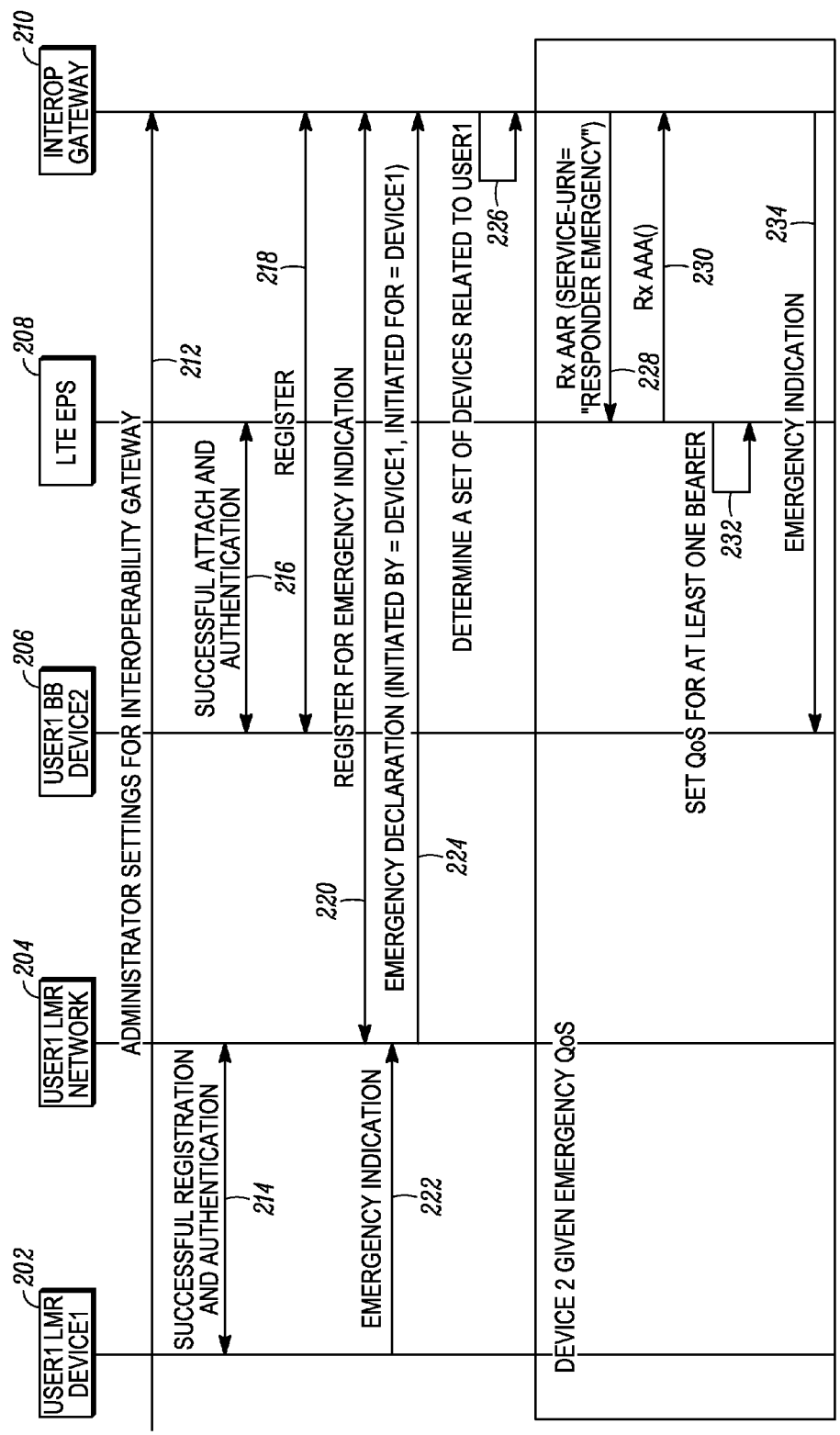
FIG. 2 is a signaling diagram illustrating setting of QoS for a bearer in response to an emergency event, in accordance with an embodiment.
Figure 3:
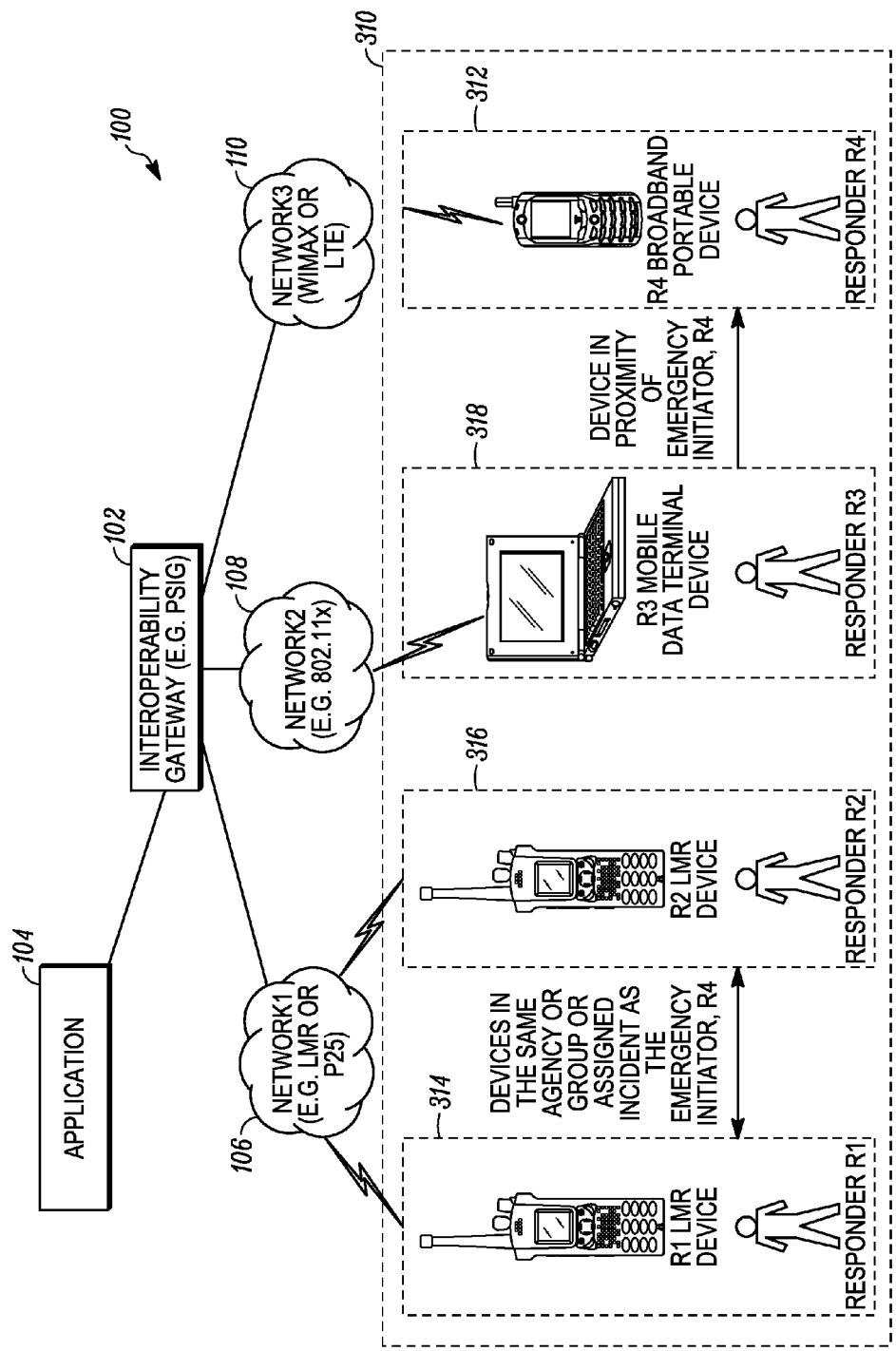
FIG. 3 is a system diagram of a communication system that implements setting of QoS for a bearer in response to an emergency event, in accordance with another embodiment.

In general, the wireless devices 114, 116, and 118 and the infrastructure devices, such as the interoperability Gateway 102, the infrastructure device housing the application 104 and the infrastructure devices included in the wireless networks 106, 108, and 110 of system 100 are implemented using one or more (although not shown) memory devices, network interfaces, and processing devices that are operatively coupled, and which when programmed form the means for these system elements to implement their desired functionality, for example, as illustrated by reference to the methods and message sequence diagrams shown in FIGS. 1-3.

The network interfaces are used for passing signaling, also referred to herein as messaging, (e.g., messages, packets, datagrams, frames, superframes, and the like) between the elements of the system 100. The implementation of the network interface in any particular element depends on the particular type of network, i.e., wired and/or wireless, to which the element is connected. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by the elements of system 100 may be partially implemented in hardware and, thereby, programmed with software or firmware logic or code for performing functionality described by reference to FIGS. 1-3; and/or the processing device may be completely implemented in hardware, for example, as a state machine or ASIC (application specific integrated circuit). The memory implemented by these system elements can include short-term and/or long-term storage of various information needed for the functioning of the respective elements. The memory may further store the software or firmware for programming the processing device with the logic or code needed to perform its functionality.

We now turn to a detailed description of the functionality of the system 100 elements in accordance with the teachings herein and by reference to the remaining figures. Turning now to FIG. 2, a signaling diagram illustrating setting of QoS for a bearer in response to an emergency event, in accordance with an embodiment is shown. FIG. 2 shows two wireless devices 202 and 206, two wireless networks 204 and 208, and an interoperability Gateway 210. In this embodiment, both wireless devices 202 in 206 are operated by the same user, a user1. Illustratively shown, the wireless device 202 for the user1 is a narrowband LMR device, and the wireless device 206 for the user1 is a broadband device. Further illustratively shown, the network 204 is an LMR network, and the network 208 is an LTE network that includes an LTE evolved packet system (EPS), which comprises a radio access network (i.e., a EUTRAN) and an evolved packet core (EPC).

Prior to operating in accordance with the present teachings, the interoperability Gateway is configured or programmed (212) with certain information to facilitate its functionality (through one or more responses) upon receiving an indication of an emergency event. In one illustrative implementation, one or more agency administrators configures the interoperability Gateway 210 through its API with policy rules to apply with regards to bearer QoS and/or applications running on one or more wireless devices, should an emergency be indicated for one of the wireless devices. For example, the interoperability Gateway 210 is configured with an identification of the "emergency" applications, supported by the wireless devices, which are to be launched (e.g., in-vehicle camera) and provided with elevated QoS when an emergency is declared and an identification of the applications to be given a downgraded QoS or preempted altogether when an emergency is declared, is configured with the emergency QoS to apply to in-progress bearers, and is configured to create one or more new dedicated bearer's in response to an emergency declaration (preemption will occur until these bearers are admitted).

More particularly, the interoperability Gateway 210 can be configured to set the QoS for an existing or newly established bearer in an LTE system to support one or more "emergency applications" (meaning applications for a wireless device with emergency or heightened alert status) for a wireless device by performing one or more of the following: changing allocation and retention priority (ARP) of one or more bearers; changing the pre-emption capable flag of one or more bearers; changing the pre-emption vulnerability flag of one or more bearers; changing the bearer(s) from best-effort to dedicated and vice-versa; changing the guaranteed bit-rate (GBR) and maximum bit-rate (MBR) for one or more bearers; changing the responder's access class; changing the QCI of one or more bearers; or allowing some bearers but not others; allowing some applications but not others; allocating additional bearers.

In one specific implementation, for LTE, the interoperability Gateway obtains a dedicated bearer with emergency QoS (emergency ARP priority, pre-emption capability set to 'true' and pre-emption vulnerability set to 'false') or modifies an existing bearer to have emergency QoS. The exact ARP, QCI, GBR, MBR are definable by the operator for emergency QoS. The QoS architecture can be further configured to preempt as necessary to insure the bearer allocation is successful.

For 3G systems, the exact configuration response is subject to negotiation with the carrier. However, in one illustrative implementation packets are marked with and emergency DSCP value (in the outer-most packet encapsulation). The exact DSCP value for emergency is configurable by the agency operator and will be known to the interoperability Gateway and wireless devices.

Turning back to method 200, at 214, the LMR device 202 for user1 is attached, registered and authenticated to the LMR network 204, and at 216 the broadband device 206 for user1 is attached, registered and authenticated to the LTE EPS 208. Two additional registrations are also performed that allow an emergency to be triggered by any device on any network and the interoperability gateway will know that in either case, the emergency is associated with the given user. In this illustrative implementation, broadband device 206 is registered to the interoperability Gateway 210 so that it is associated with all other devices being operated by the user1 and so that the broadband device 206 provides an indication (e.g., using a presence service) to the interoperability Gateway 210 for the user1 should an emergency event occur and be triggered at the broadband device 206.

In addition, the LMR network 204 registers for emergency indication operation with the interoperability Gateway 210. This registration enables an element of network 204 to provide an indication of an emergency event to the interoperability Gateway should one be triggered by a device attached to the LMR network. This registration allows an emergency indication from one device on one network to be delivered to another network and adjust the QoS for the other device on the second network. It should be noted that in a further embodiment, the broadband network can register with the interoperability gateway similar to the LMR network. Then an emergency indication on the broadband network is delivered to the interoperability Gateway (by Presence service on the broadband network as described).

At 222, the LMR device 202 (e.g., a first device) that is attached to the LMR network 204 (e.g., a first network of a first type) signals an emergency indication to the LMR network 204. For example a responder provides an emergency trigger to the LMR network 204 by pressing a physical button or soft key on the responder's device. In an alternative arrangement, a device other than the LMR device 202 (e.g., the device housing the application 104) provides the indication of the emergency event for the user1 to the interoperability Gateway 210, e.g., via the API. Moreover, alternatively, the user1 can trigger the emergency indication via his broadband device 206. To support the devices 202 or 206 providing the emergency indication (which is communicated to the interoperability Gateway 206 either via the access network or the API), at least one up link bearer may need to be allocated to the wireless device to support this signaling of the emergency.

At 224, in this illustrative implementation, an emergency indication triggered or initiated by signaling 222 from the LMR device 202 (or from the application 104) is provided to the interoperability Gateway 210. In response to the received indication of an emergency event for the user1 (first user), the interoperability Gateway 210 determines (210) a set of devices related to the user 1, wherein the set of devices includes the LMR device 202 and at least one other device operating in a different (second) network (e.g., the LTE EPS 208) of a different type from the network to which the LMR device 202 is attached. In this example, the set of devices related to user1 are all operated by user1. Accordingly, the interoperability Gateway 210 determines that the set includes LMR device 202 and broadband device 206 operated by user1.

At 228 and 230, the interoperability Gateway 210 instructs a network element (e.g., PDN Gateway) to set the QoS for at least one bearer for the broadband device 206, using for instance messaging over and Rx interface between the Gateway 210 to a PCRF, wherein the PCRF communicates with the PDD Gateway. Such instruction is based at least in part on an analysis of the rules configured into the interoperability server 210. Based on the results of this analysis, the network element can be instructed to modify the QoS for an existing bearer for the broadband device 206 or to establish a bearer for the broadband device 206 having to specify QoS to support one or more applications already running on the broadband device 206 or to support an emergency application initiated by the interoperability Gateway 210. Further in accord with another embodiment, responsive to receiving the indication of the emergency event, the interoperability Gateway 210 modifies an authorization for the initiated application. More particularly, during an emergency, some applications may not be authorized for use (i.e., they are blocked from being launched), and when the emergency is in effect, only certain applications should be launched. Thus in accordance with one embodiment of the present disclosure, during an emergency, some devices may be authorized to use applications that these devices are not normally authorized to use.

The network element in the LTE EPS 208, at 232, set the QoS for the bearers as instructed by the interoperability Gateway 210. The interoperability Gateway 210 further notifies the broadband device 206 of the emergency indication, e.g., using a presence notification feature, and may optionally initiate one or more emergency applications in the broadband device 206. In this case, since the LMR network 204 is registered for emergency indication, it can proceed to set the QoS for bearers that support applications running on the LMR device 202. However, in an alternative implementation the interoperability Gateway 210 could facilitate the setting of QoS for new or modifying of QoS for existing bearers in all the networks to which the user1 devices are attached.

FIG. 1 further illustrates the implementation scenario where a set 112 of devices related to a responder R1 involved in an emergency event are all devices operated by the responder. However, in another illustrative implementation, the set of devices related to a responder R1 involved in an emergency event includes at least two devices operated by different users. As illustrated in FIG. 3, a set 310 of devices comprises devices 314 and 316 (both LMR devices), 318 (a mobile data terminal), and 312 (a broadband portable device) all operated by different users (responders R1, R2, R3, and R4). Moreover, the devices span different types of access networks 106, 108, 110 (narrowband and broadband) and may span one or more jurisdictions.

In the embodiment, illustrated by reference to FIG. 3, the set of devices in this instance can be determined based on a number of factors. For instance determining the set of devices can include one or more of: determining a plurality of devices within a defined proximity of the first user, wherein the defined proximity comprises multiple jurisdictions; determining a plurality of devices assigned to the same agency as the first user; or determining a plurality of devices assigned to the same incident as the first user. Location and incident information received at the interoperability Gateway 102 can be used to determine the set of devices in this scenario. As in the case where the set of devices are all operated by the same user, the interoperability Gateway 102 determines how QoS should be set for the devices and the set and instructs their relative access networks.

Following are examples of responses that the interoperability Gateway102 can implement in response to an indication of an emergency event for a responder. Response 1: all devices associated with the responder receive elevated QoS and dedicated access network resources. For example, activating the emergency button on an LMR radio causes dedicated priority of existing LTE bearers and creation of new LTE bearers for the responder's matching broadband device(s). Also, the LMR device will receive elevated QoS treatment. Some to all of the responder's in-progress applications (per configuration) receive emergency QoS. Response 2: all members of the responder's LMR and Broadband groups are given elevated QoS and dedicated access network resources. For example, all members of the responder's LMR PTT (push-to-talk) group and their matching LMR and broadband devices are given elevated QoS and dedicated access network resources. Response 3: all devices (human-based and autonomous) within a proximity (or number of cells) of the device declaring the emergency receive elevated QoS and dedicated access network resources. The proximity can span one or more agencies/jurisdictions. Response 4: all devices belonging to the same agency as the device declaring the emergency receive elevated QoS and dedicated access network resources. Response 5: all devices associated with the same incident as the device declaring the emergency receive elevated QoS and dedicated access network resources. Response 6: some to all applications associated one or more of the responder's device(s) receive a downgraded QoS.

Thus, in accordance with the teachings herein, an emergency declaration can be made by one of the responder's devices or by a third party (such as a CAD operator) or by a third party device or by one of the responders. When a user has declared an emergency, all devices associated with the user (LMR and broadband) obtain elevated QoS resources. Also, variations of this disclosure allow other responders in a relationship (e.g. close by, part of the same agency, part of the same group, etc.) with the responder declaring the emergency to also receive elevated QoS for their device(s). Existing bearers receive elevated QoS (e.g. elevated ARP priority and/or QCI values). New bearers are established per agency policy (to match the application(s) the agency deems essential during an emergency).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for described herein. The non-processor circuits may include, but are not limited to, a radio receiver, a radio transmitter, signal drivers, clock circuits, power source circuits, and user input devices. As such, these functions may be interpreted as steps of a method to perform the setting of QoS of one or more bearers in response to an emergency indication described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of setting Quality of Service for a wireless wide area network (WAN) bearer in response to an emergency event, the method comprising:
an interoperability gateway performing:
receiving a signal from a first device, wherein the signal comprises an indication of an emergency event for a first user and wherein the first user is operating the first device in a first wireless WAN of a first network type;
responsive to receiving the indication, determining a set of devices related to the first user, wherein the set of devices includes the first device and at least a second device operating in a second wireless WAN of a second network type;
instructing the second WAN to modify at least one Quality of Service setting for a bearer belonging to the second WAN, wherein the bearer belonging to the second WAN is for use by the second device for transport of content.

2. The method of claim 1, wherein the second wide area network is instructed to modify the Quality of Service for an existing bearer for the second device.

3. The method of claim 1, wherein the second wide area network is instructed to apply a Quality of Service setting for a bearer established for the second device.

4. The method of claim 1 further comprising instructing the first wide area network to modify the Quality of Service for an existing bearer for the first device.

5. The method of claim 1, wherein the first network type is different from the second network type.

6. The method of claim 1 further comprising, responsive to receiving the indication of the emergency event, initiating an application for at least one of the first device or the second device.

7. The method of claim 1 further comprising, responsive to receiving the indication of the emergency event, modifying an authorization to allow the second device to use an application.

8. The method of claim 1, wherein determining the set of devices comprises determining a plurality of devices operated by the first user.

9. The method of claim 1, wherein determining the set of devices comprises determining at least one device, including the second device, which is operated by a user other than the first user.

10. The method of claim 1, wherein determining the set of devices comprises determining a plurality of devices within a defined proximity of the first user.

11. The method of claim 10, wherein the defined proximity comprises multiple jurisdictions.

12. The method of claim 1, wherein determining the set of devices comprises determining a plurality of devices assigned to a same agency as the first user.

13. The method of claim 1, wherein determining the set of devices comprises determining a plurality of devices assigned to a same incident as the first user.

14. The method of claim 1, wherein the indication of an emergency event is provided by an entity other than the first device.

15. The method of claim 1, wherein instructing the second network to set Quality of Service for at least one bearer for the second device comprises instructing the second wide area network to change at least one of:
- allocation and retention priority of a bearer currently allocated to the second device;
- a scheduling priority of a bearer currently allocated to the second device;
- a level of performance of a service data flow from the second device;
- a user's access class; or
- a default bearer currently allocated to the second device to a dedicated bearer having a specified Quality of Service.

16. The method of claim 1 further comprising lowering the Quality of Service for an application running on a device in the set of devices.

17. A system for setting Quality of Service for a wireless wide area network (WAN) bearer in response to an emergency event, the system comprising:
- an interface configured to connect to a device to receive a signal from a first device, wherein the signal comprises an indication of an emergency event for a first user and wherein the first user is operating the first device in a first wireless WAN of a first network type; and
- a processing device couple to the interface and configured to:
  - responsive to receiving the indication, determine a set of devices related to the first user, wherein the set of devices includes the first device and at least a second device operating in a second wireless WAN of a second network type;
  - instruct the second WAN to set Quality of Service for at least one bearer belonging to the second WAN, wherein the bearer belonging to the second WAN is for use by the second device for transport of content.

* * * * *